(12) United States Patent
Guda et al.

(10) Patent No.: US 8,068,805 B2
(45) Date of Patent: Nov. 29, 2011

(54) RF SELECTION DIVERSITY MODULE

(75) Inventors: Prakash Guda, Fremont, CA (US); Mark Tanner, Dublin, CA (US); Jason A. Trachewsky, Menlo Park, CA (US); Loi Tran, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 946 days.

(21) Appl. No.: 11/716,854

(22) Filed: Mar. 12, 2007

(65) Prior Publication Data

US 2008/0119230 A1 May 22, 2008

Related U.S. Application Data

(60) Provisional application No. 60/860,181, filed on Nov. 20, 2006.

(51) Int. Cl.
*H04B 1/28* (2006.01)
*H04B 1/16* (2006.01)
*H04W 4/00* (2009.01)

(52) U.S. Cl. .................... 455/333; 455/334; 370/334

(58) Field of Classification Search .................. None
See application file for complete search history.

(56) References Cited

U.S. PATENT DOCUMENTS

| 7,565,126 | B2 * | 7/2009 | Shatara et al. | 455/272 |
|---|---|---|---|---|
| 2004/0121753 | A1 * | 6/2004 | Sugar et al. | 455/333 |
| 2005/0243773 | A1 * | 11/2005 | Lin et al. | 370/334 |
| 2006/0139833 | A1 * | 6/2006 | Ranta et al. | 361/113 |
| 2006/0205380 | A1 * | 9/2006 | Sugar et al. | 455/333 |

* cited by examiner

*Primary Examiner* — Jinsong Hu
*Assistant Examiner* — William Nealon
(74) *Attorney, Agent, or Firm* — Garlick Harrison & Markison

(57) ABSTRACT

An integrated circuit radio transceiver and method therefor includes circuitry and logic for transmitting outgoing or ingoing communication signals as well as one of a digital data signal or a digital clock on the same antenna signal paths between a radio and a switch fabric. The switch fabric is operable to selectively couple any of a plurality of antennas to antenna signal paths based upon the digital data and the digital clock extracted from at least one of the antenna signal paths conducting RF signals. The switch fabric is further operable to extract all required power from at least one antenna signal path that may be used to conduct RF.

17 Claims, 9 Drawing Sheets

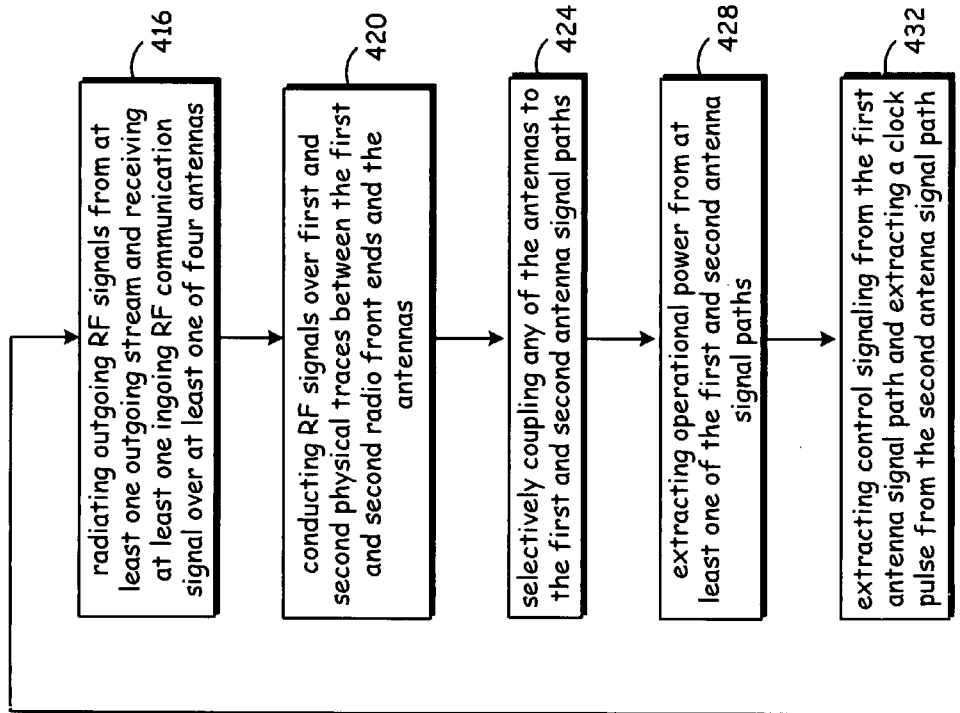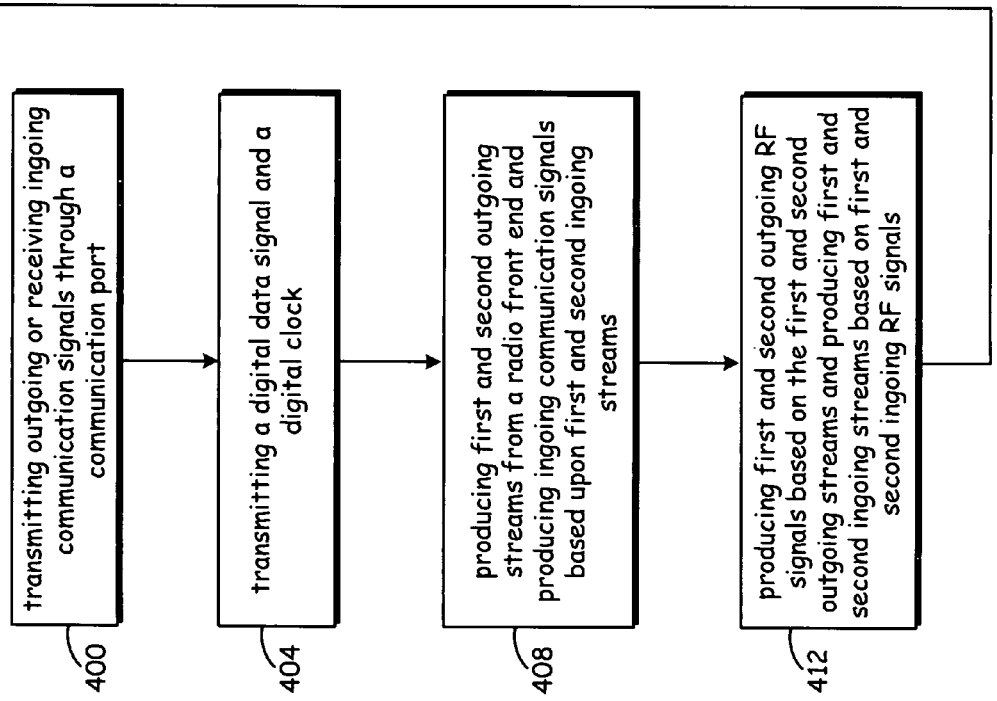
FIG. 9

RF SELECTION DIVERSITY MODULE

CROSS REFERENCE TO RELATED APPLICATION

The present application also claims priority under 35 USC §119(e) to U.S. Provisional Application Ser. No. 60/860,181, filed Nov. 20, 2006 and entitled "RF SELECTION DIVERSITY MODULE", which is incorporated herein by reference in its entirety for all purposes.

BACKGROUND

1. Technical Field

The present invention relates to wireless communications and, more particularly, to circuitry for transmitting and receiving wireless signals.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

With current design emphasis to reduce scale and improve circuit efficiency, design approaches that reduce the number of circuit components, circuit size and number of traces or signal paths is advantageous. What is needed, therefore, is a radio receiver with circuitry that is operable to improve hardware efficiency while providing expected operation.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 9 illustrates a method for transmitting and receiving RF signals and for controlling antenna switching according to one embodiment of the invention.

DETAILED DESCRIPTION OF THE DRAWINGS

Figure 1:
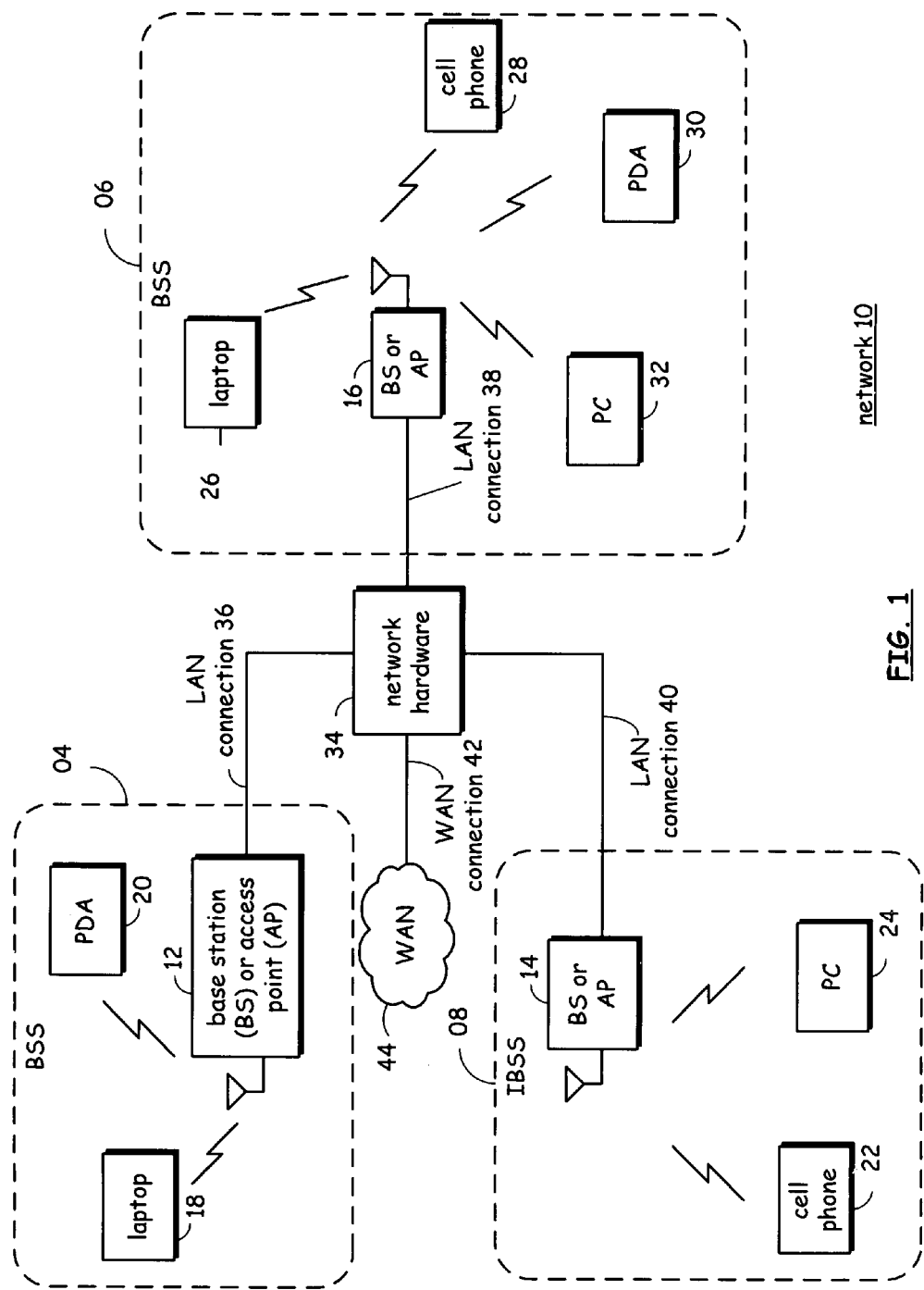
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Generally, a device 18-36 of FIG. 1 may be formed to include logic and circuitry of the present invention in which a number of physical traces to control and communicate through a plurality of antennas are reduced to improve hardware efficiency.

Figure 2:
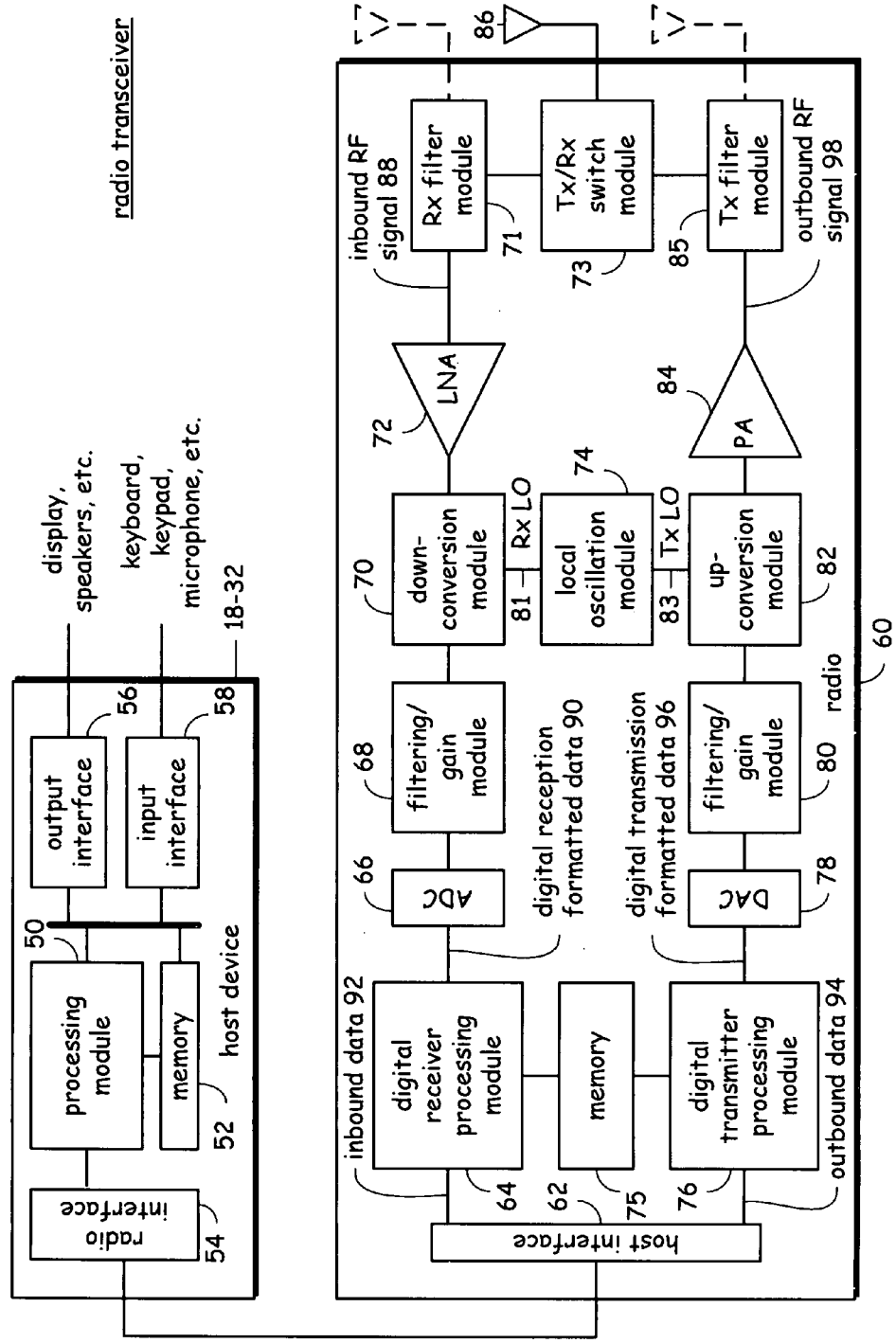
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
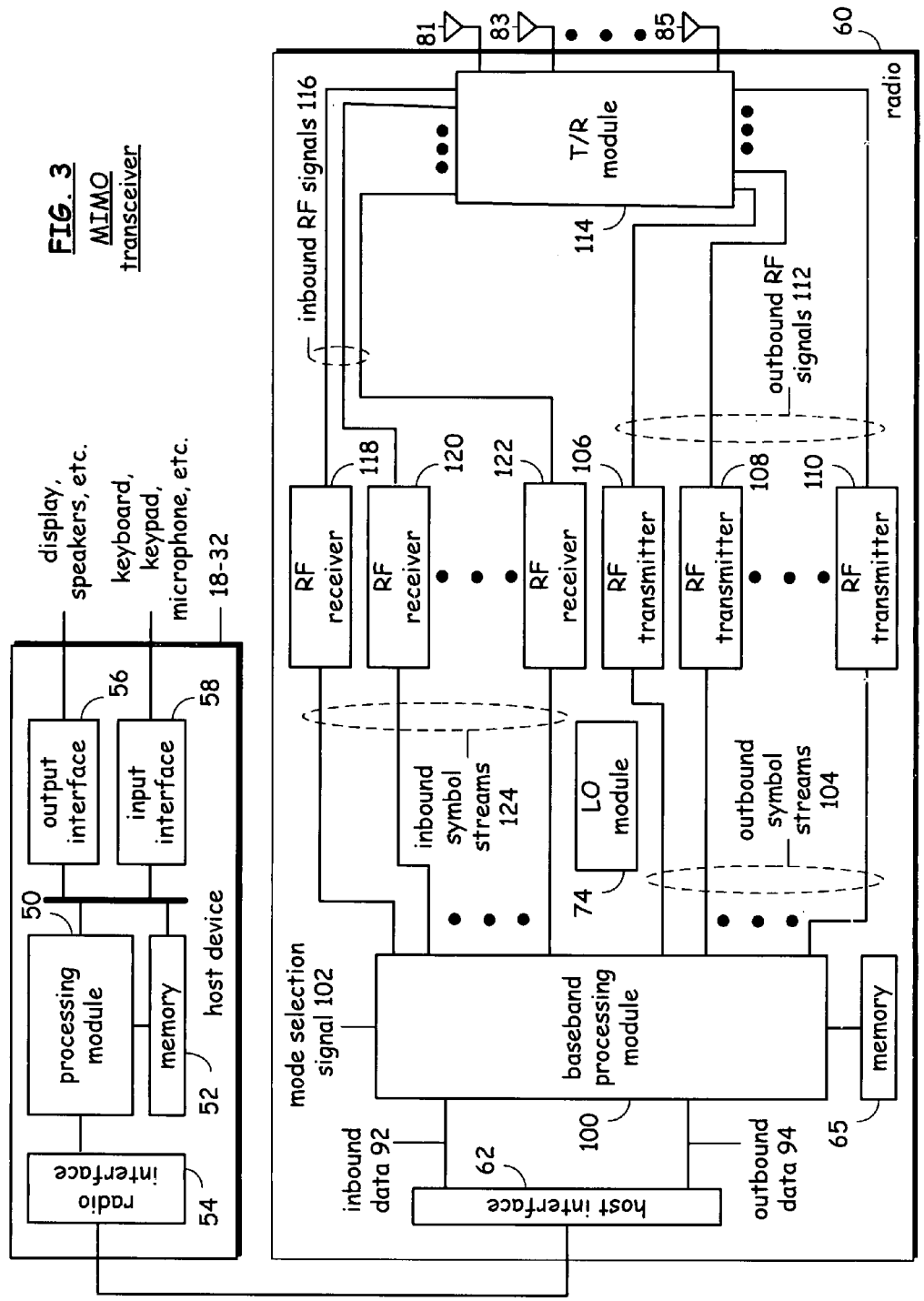
FIG. 3 is a schematic block diagram illustrating a wireless communication device that includes a host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
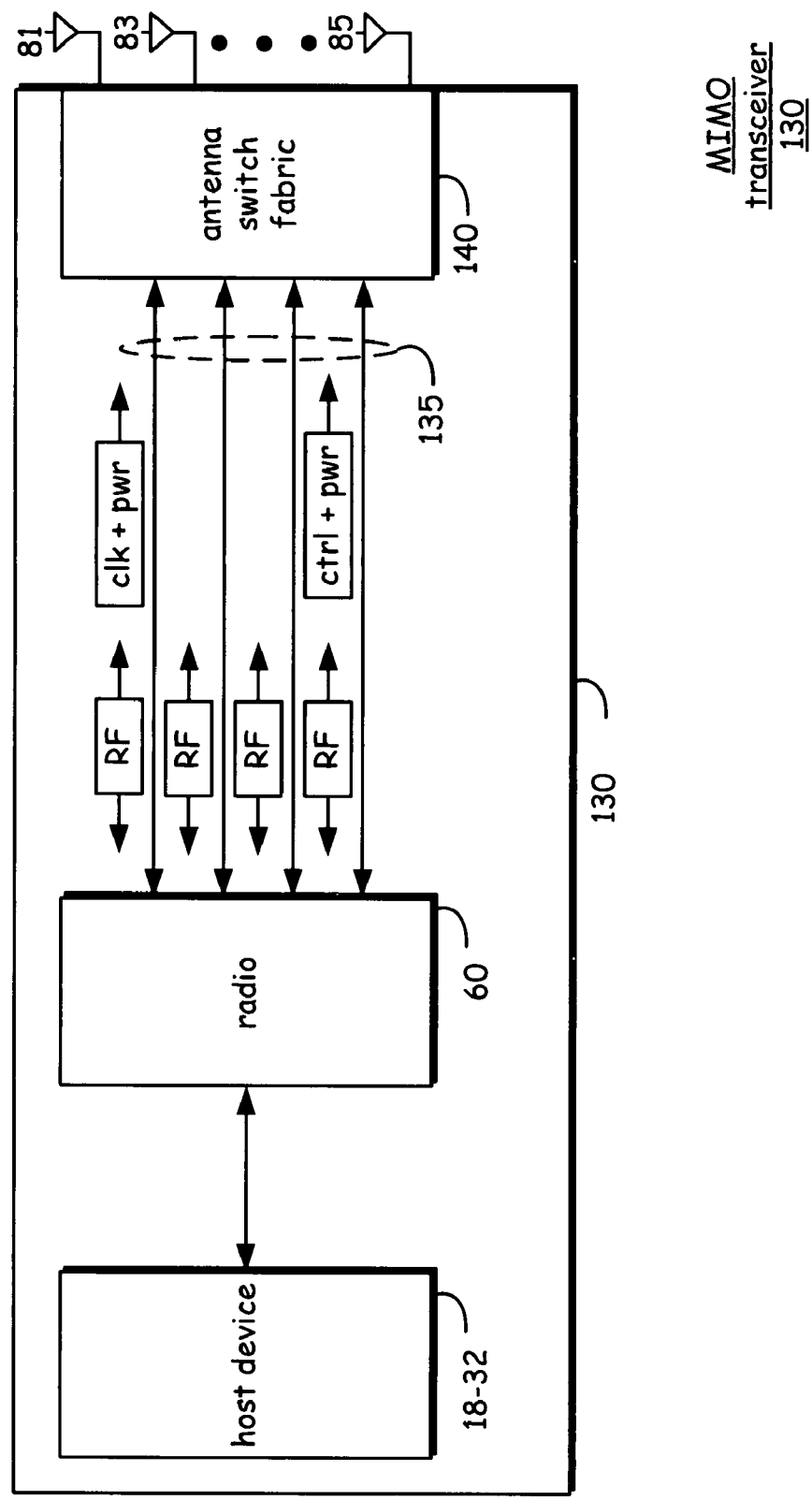
FIG. 4 is a functional block diagram of a multiple-in multiple-output (MIMO) transceiver according to one embodiment of the invention.

FIG. 4 is a functional block diagram of a multiple-in multiple-output (MIMO) transceiver according to one embodiment of the invention. A transceiver 130 includes a host device 18-32 and a radio 60 as described above in relation to FIGS. 2 and 3. Further, transceiver 130 includes a plurality of antenna signal paths 135 that couple radio 60 to antenna switch fabric 140. Antenna switch fabric is operable to couple selected antenna signal paths of antenna signal paths 135 to one or more of antennas 81-85.

Generally, antenna signal paths 135 are physical traces that extend from radio circuitry of radio 60 through packaging of the transceiver 130 to antenna switch fabric 140. Antenna switch fabric 140 is disposed proximate to antennas 81-85 and is operable to selectively couple the antennas to the antenna signal paths according to factors such as transmission mode of operation of MIMO transceiver 130.

One aspect of the embodiment of FIG. 4 is that at least two of the antenna signal paths of the antenna signal paths 135 are used to conduct control signaling for the antenna switch fabric and a clock signal to drive the control signaling processing by the switch fabric 140 in addition to conducting RF between the antennas and the antenna signal paths. Further, antenna switch fabric 140 extracts operational power from at least one of the antenna signal paths carrying the control signaling or the clock signals. In one embodiment, power is extracted from both lines that carry the control signaling and clock signals.

In operation, therefore, radio 60 produces or receives RF over one or more antenna signal paths while producing clock signals and control signaling on two of the antenna signal paths. Antenna switch fabric 140 performs switching to couple specified antennas to specified antenna signal paths based upon the control signaling and clock signals conducted on the antenna signal paths. Further, at least one power input of the antenna switch fabric is coupled to receive power from at least one of the antenna signal paths carrying the control signaling and clock signals.

Figure 5:
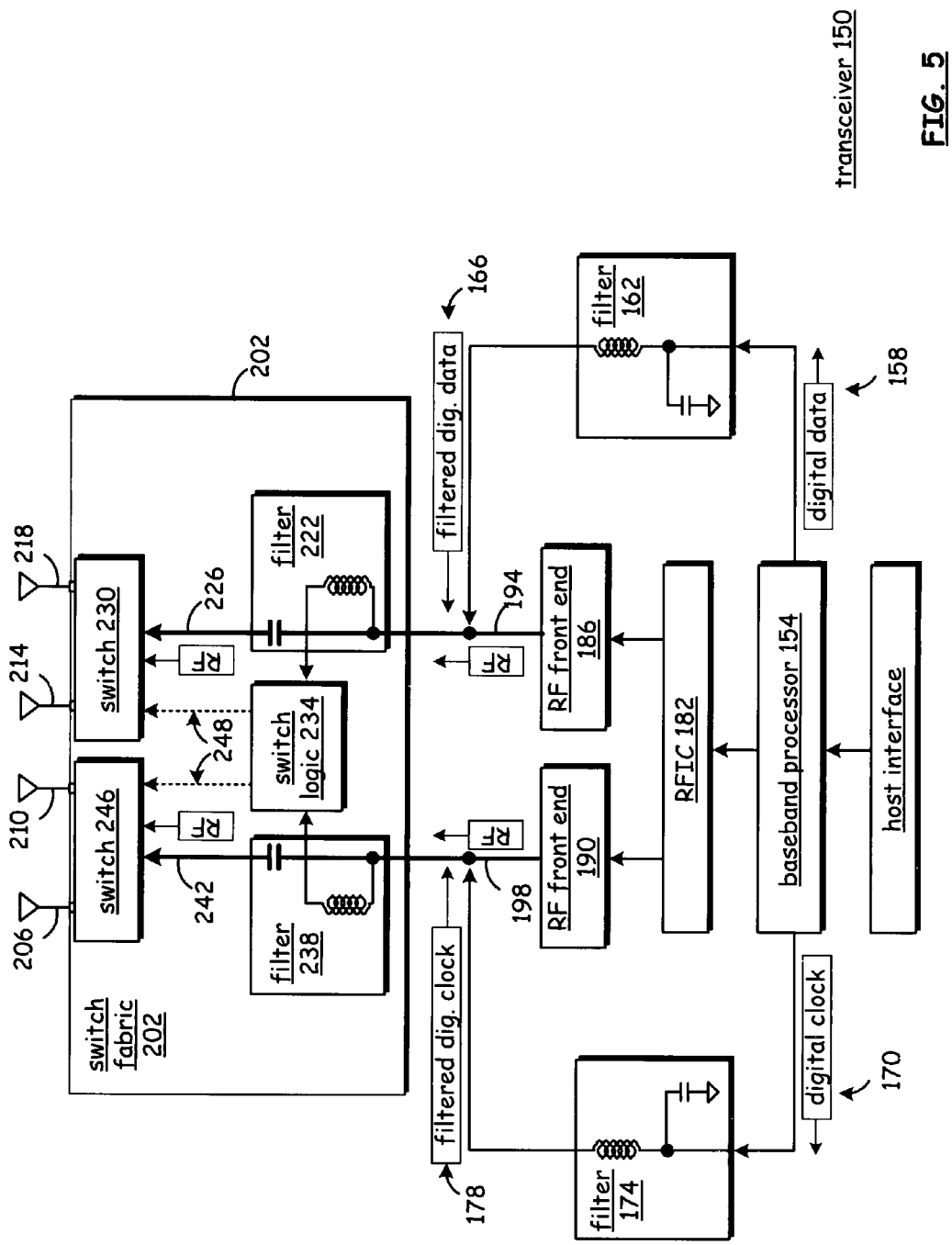
FIG. 5 is a functional block diagram of a multiple-in multiple-output (MIMO) transceiver operating as transmitter according to one embodiment of the invention.

FIG. 5 is a functional block diagram of a multiple-in multiple-output (MIMO) transceiver operating as a transmitter according to one embodiment of the invention. A transceiver 150 includes a baseband processor 154 having a communication port for transmitting wireless communication signals. Baseband processor 154 further includes first and second digital data ports for transmitting switch control signaling and a corresponding clock signal. More specifically, a specified digital data signal 158 (the switch control signaling) is transmitted from the first digital data port to a filter 162 that is operable to block high frequency components, such as noise and internal clock signals that may interfere with radio frequency signals, and to pass low frequency components that contain data or control information. Filter 162 produces filtered digital data 166 which is combined with an RF signal on an antenna signal path.

Similarly, baseband processor 154 further produces a digital clock 170 from a second digital port to filter 174. Filter 174 is operable to block high frequency components (noise, internal clock signals, etc.) that may interfere with radio frequency signals and to pass low frequency components that contain data or control information. Filter 174 produces filtered digital clock 178 which is combined with an RF signal on an antenna signal path.

Baseband processor 154 also produces outgoing digital data from a communication port for transmission to a radio frequency integrated circuit (RFIC) 182 for signal processing. The signal processing within RFIC 182 is operable to generate an outgoing digital signal stream having sample rates and a signal form appropriate for the desired signal characteristics for conversion to a continuous waveform and for upconversion to radio frequency. RFIC 182 produces at least one outgoing digital signal stream for RF front end processing prior to transmission. In the described embodiment, RFIC 182 is operable to produce a first outgoing digital signal stream to an RF front end 186 and a second outgoing digital signal stream to an RF front end 190.

It should be understood, however, the invention is not limited to two outgoing signal streams and two outgoing signal stream paths. Moreover, it should also be understood that in certain modes of operation not all signal paths are required to be used. Thus, for example, RFIC 182 may only produce a single outgoing signal stream to one of RF front ends 186 and 190.

Referring back to FIG. 5, RF front end 186 produces an outgoing RF signal onto antenna signal path 194 where it is combined with filtered digital data 166 while RF front end 190 produces an outgoing RF signal onto antenna signal path 198 wherein it is combined with filtered digital clock 178. Each of the RF signals produced by RF front ends 186 and 190 are then produced to switch fabric 202. Switch fabric 202 then produces outgoing RF signals to at least one of a plurality of antennas. In the embodiment of FIG. 5, antennas 206, 210, 214 and 218 are selectably coupled through switch fabric 202 to radiate outgoing RF signals according to switching based upon control signals produced by switch logic 234 that produces the control signals based upon filtered digital data 166 initially generated by baseband processor 154 as digital data 158.

Switch logic 234 is operable, based upon the filtered digital data 166 and upon the filtered digital clock 178, to produce control signals on switch control lines 248 to specify what antennas are operably coupled to antenna signal paths 226 and 242 for radiating outgoing RF signals. In the described embodiment of the invention, switch logic 234 comprises a serial-to-parallel converter in the described embodiment of the invention. Accordingly, at least two control lines are used between switch control logic 234 and each of switches 230 and 246 for controlling what antennas are used to radiate outgoing signals. Thus, each switch control line 248 represents one or more control lines, as necessary, for sending control signals to a switch to selectively couple a switch to an RF signal path. This applies for outgoing RF transmissions, as in this embodiment of FIG. 5, or for ingoing RF signals as described below in relation to FIG. 7. One of average skill in the art may readily determine how many switch control lines 248 are necessary for controlling corresponding switches.

One aspect of the embodiment of FIG. 5 is that antenna signal path 194 is operably coupled to conduct outgoing RF for transmitter operations (or ingoing RF for receiver operations) as well as filtered digital data 166, while antenna signal path 198 is operably coupled to conduct outgoing RF (or ingoing RF) as well as filtered digital clock 178. Further, power for operating switch fabric 202 is derived from filtered digital data 166 and from filtered digital clock 178. As such, antenna signal paths 194 and 198 both conduct RF signals, data and clock signals, and provide power to operate switch fabric 202.

Examining switch fabric 202 more specifically, a filter 222 is coupled to antenna signal path 194 and is operable to receive the RF and the filtered digital data 166 and to produce the RF over antenna signal path 226 to switch 230 for propagation from at least one of antennas 214 and 218. Filter 222 is further operable to produce filtered digital data 166 to switch logic 234. Similarly, a filter 238 is coupled to antenna signal path 198 and is operable to receive the RF and the filtered digital clock 178 and to produce the RF over antenna signal path 242 to switch 246 for propagation from at least one of antennas 206 and 210. Filter 238 is further operable to produce filtered digital clock 178 to switch logic 234.

In operation, transceiver 150 is a MIMO transceiver operable to transmit and receive from one or more antennas although transmit operations are shown in FIG. 5. Thus, for transmitter operations as shown in FIG. 5, baseband processor 154 produces outgoing communication signals over a communication port to RFIC 182 and digital data 158, which comprise switch control signals, over a first digital port. Additionally, baseband processor 154 produces a digital clock which is used by switch logic 234 as a clock for effectuating the switching and the generation of switch control signals over switch control lines 248 based upon filtered digital data 166.

Generally, referring again to each of the filters 162 and 174 are L-C filters operably disposed to block high frequency signal components (e.g., spurious noise or undesired internal clock signals) produced with the digital data 158 or digital clock 170 while passing the digital data 158 and digital clock 170, respectively. Filters 222 and 238, on the other hand, are operably disposed to pass RF to the corresponding switch 230 or 246 while blocking lower frequency signals (i.e., the filtered digital data 166 or filtered digital clock 178, respectively) and to block RF while passing the filtered digital data 166 or filtered digital clock 178, respectively to switch logic 234. Switch logic 234, therefore is operable to produce switching control signals over switch control lines 248 to switches 246 and 230 based upon the filtered digital data 166 and filtered digital clock 178.

The capacitive elements in filters 162, 174, 222 and 238 are sized to operate as a short to high frequency components including RF components of a signal while operating to block DC signals as well as relatively low frequency signals (e.g., 10 MHz signals for the filtered digital data and digital clock produced by baseband processor 154), while inductive elements pass DC and relatively low frequency signals while blocking high frequency components. Here, the filtered digital data 166 and filtered digital clock 178 have data rates in the magnitude of 10 MHz while the RF signals have frequency components in the magnitude in excess of 2 GHz. Thus, the inductive and capacitive elements are sized such that 10 MHz effectively is blocked by the capacitive elements of the filters and is passed by the inductive elements (as DC) while 2 GHz frequency signals are passed by the capacitive elements while being blocked by the inductive elements. One of average skill in the art may therefore readily determine the specific sizing according to design implementation and requirements.

While the specific embodiment illustrates two switches and four antennas, it should be understood that any number of switches and antennas may be used in alternate embodiments of the invention. Thus, for example, one switch with eight antennas may be used. In such a case, a corresponding number of control lines would be output by switch logic 234 to selectively couple the switches to the antenna signal paths. Moreover, while only two antenna signal paths are shown, it should be understood that other embodiments of the invention may have more outgoing signal paths (e.g., four outgoing signal paths) to support desired operations. Generally, any MIMO transceiver with a first plurality of signal paths and a second plurality of antennas may practice the concepts of the various embodiments of the invention.

Generally, in the described embodiment, baseband processor 154 is operable to produce a digital clock 166 that is used by switch logic 234 to generate the parallel output that controls switching in one or more switches. Here, switch logic 234 produces parallel control signals to switch 246 and switch 230. It should be understood that switches 230 and 246 may be combined as one switch or may be replaced by a greater number of switches for an embodiment having a greater number of antennas than four as shown here in FIG. 5. One aspect of the embodiment of the present invention, as will be shown in greater detail in discussion relating to figures that follow, the switch fabric of the various embodiments is operably coupled to receive and extract power needed for operation solely from an antenna signal path that is conducting at least one of the filtered digital data 166 and filtered digital clock 178 in addition to outgoing RF.

Continuing to refer to FIG. 5, RFIC 182 is operable to produce one or two outgoing signal streams over at least one of two signal paths. Two signal paths are shown in the described embodiment though the embodiments of the invention are not limited to two signal paths. Here, in operations in which two outgoing signal streams are produced, RFIC 182 is operable to produce first and second outgoing streams to RF front end 186 and RF front end 190, respectively.

RF front ends 186 and 190 are operable to convert the outgoing streams to a continuous waveform at a baseband or at an intermediate frequency and then to up-convert the continuous waveform signals to a radio frequency as outgoing RF signals. These outgoing RF signals are produced, for example, on first and second physical traces for transmission from at least one of a plurality of antennas. In the described embodiment, the RF signals produced from RF front end 186 are produced onto antenna signal path 194 for transmission from at least one of antennas 214 and 218.

RF signals produced from RF front end 190 are produced onto antenna signal path 198 for transmission from at least one of antennas 206 and 210. In this described embodiment, switch fabric 202 comprises separate switches, each of which is connected to one of the antenna signal paths 242 and 226. Accordingly, switch 246 is operable to selectively couple antennas 206 and 210 to antenna signal path 242 to radiate RF signals produced by RF front end 190. Similarly, switch 230 is operable to selectively couple antennas 214 and 218 to antenna signal path 226 to radiate RF signals produced by RF front end 186.

Baseband processor 154 is further coupled to produce digital data 158 to filter 162 which, in the described embodiment, is an inductive/capacitive (LC) filter operable to short high frequency signal components to circuit common while blocking the digital data 158 from being conducted to circuit common and, conversely, to block high frequency signal components while passing the digital data 158. While the digital data may comprise, for example, a 10 MHz clocked digital signal, the inductive element is sized to conduct the digital data un-impeded while blocking substantially higher frequency signals. Similarly, the capacitive element is sized to block the digital data while operating as a short to substantially higher frequency signal components.

As such, filter 162 produces filtered digital data 166 to a node common to antenna signal path 194 carrying an outgoing RF signal produced by RF front end 186. A combined signal is thus produced to switch fabric 202 which is operable to extract control information from the filtered digital data 166 portion of the combined signal to perform specified switching and to pass the RF signal portion of the combined signal to at least one antenna according to the specified switching.

The switch fabric 202 is operably disposed between the first, second, third and fourth antennas collectively, and the first and second radio front ends as may be seen in FIG. 5. The switch fabric 202 is operable to selectively couple the first and second antennas to the first physical antenna signal path. Similarly, switch fabric 202 is operable to couple the third and fourth antennas to the second physical antenna signal path in the described embodiment. The switching performed by the switch fabric is based upon a digital clock and upon digital data (control signals) conducted by at least one of the first and second antenna signal paths that are also conducting RF signals between RF front end circuitry and at least one antenna. Further, the switch fabric 202 extracts operational power from at least one of the first and second physical antenna signal paths conducting RF signals. Advantageously, only one physical trace (antenna signal path) is used to carry control signaling, an RF signal (ingoing or outgoing) and to provide power for switching logic thereby reducing the number of lines required for antenna switching operations in a transceiver between RF front end circuitry and switching logic coupled to the plurality of antennas.

Figure 6:
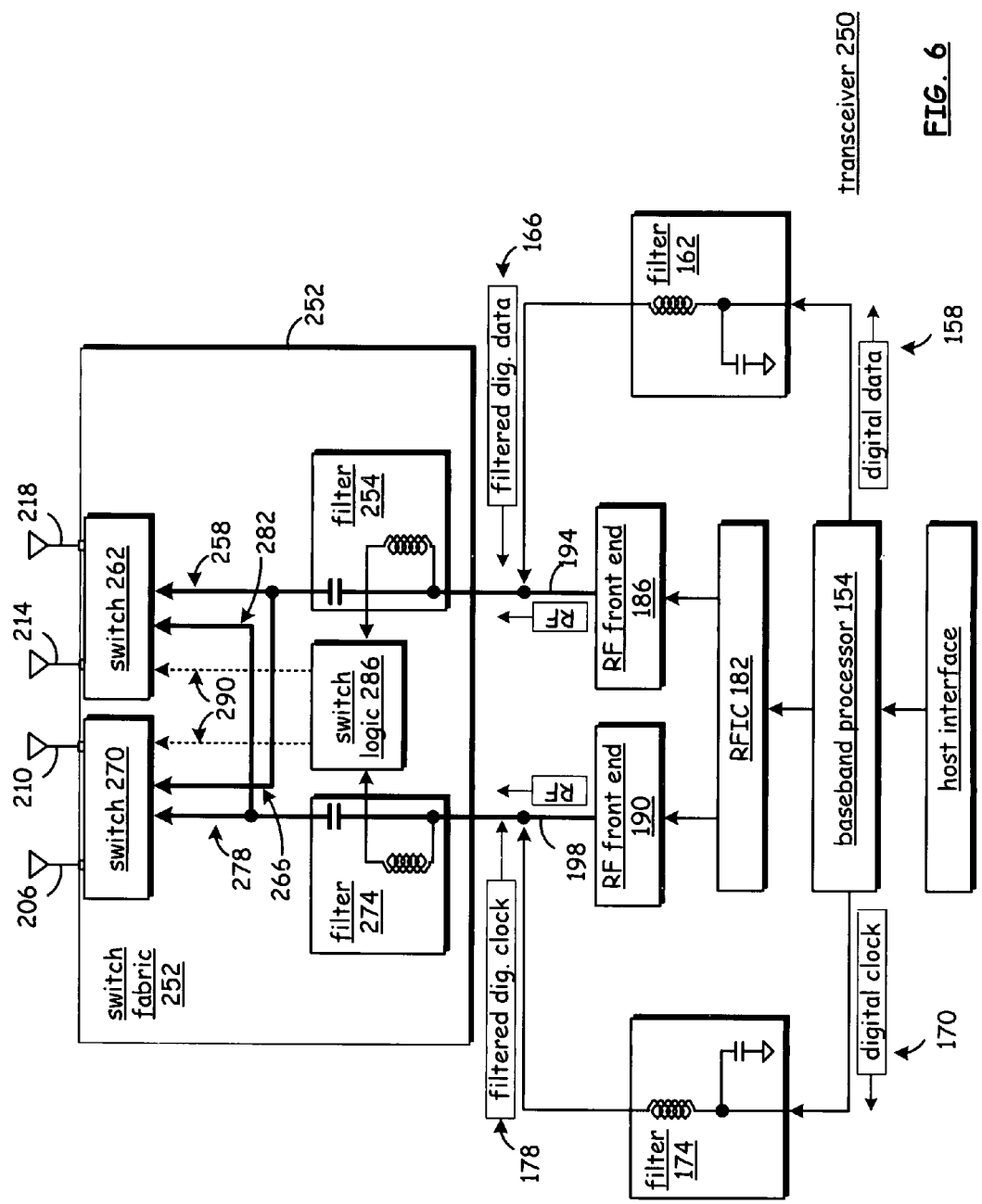
FIG. 6 is a functional block diagram of a multiple-in multiple-output (MIMO) transceiver operating as a transmitter according to one embodiment of the invention.

FIG. 6 is a functional block diagram of a multiple-in multiple-output (MIMO) transceiver operating as a transmitter according to one embodiment of the invention in which each antenna may selectively be coupled to any antenna signal path. Generally, FIG. 6 is similar to FIG. 5 except that additional signal paths are provided between the switches and the filters of the switch fabric to enable any antenna to be selectively coupled to any antenna signal path. Thus, the switches of FIG. 6 have multiple inputs as well as multiple outputs to support the desired switching.

More specifically, a transceiver 250 includes a switch fabric 252 that is coupled to receive filtered digital data 166 from antenna signal path 194. A filter 254 is operably disposed to receive filtered digital data 166 and to produce RF onto antenna signal path 258 to switch 262, and onto antenna signal path 266 to switch 270. Similarly, a filter 274 is operable to produce RF onto antenna signal path 278 to switch 270, and onto antenna signal path 282 to switch 262.

Filters 254 and 274 are operable to produce filtered digital data 166 and filtered digital clock 178 to switch logic 286. Switch logic 286 is operable to produce switching control signals on a plurality of control lines 290. Switches 262 and 270 are each operable to couple at least one antenna signal path of a plurality of antenna signal paths to at least one of a plurality of antennas. In the described embodiment, switch 262 is operable to couple at least one of antennas 214 and 218 to either of antenna signal paths 258 or 282. Switch 270 is operable to couple at least one of antennas 206 and 210 to either of antenna signal paths 266 or 278.

Figure 7:
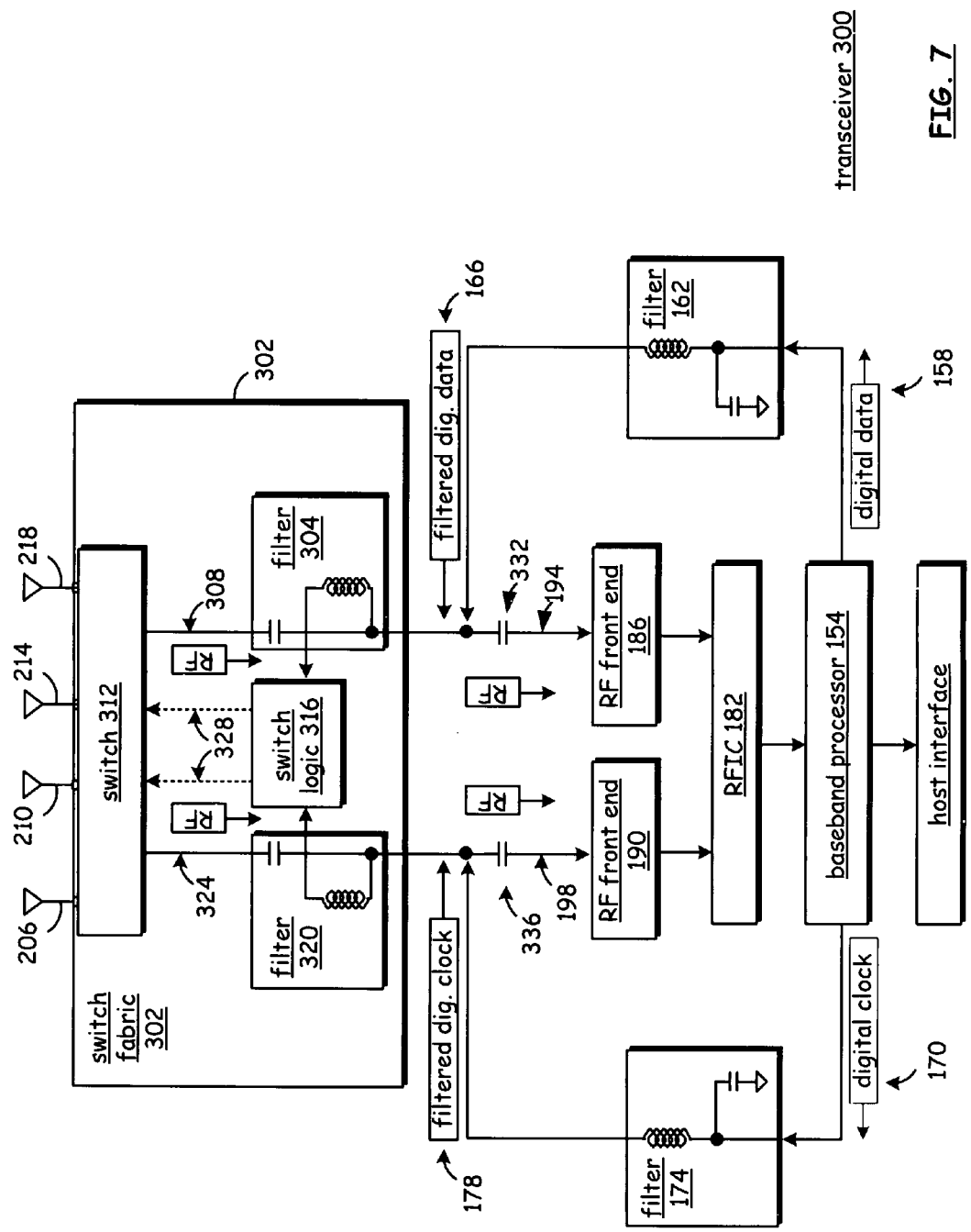
FIG. 7 is a functional block diagram of a multiple-in multiple-output (MIMO) transceiver operating as receiver according to one embodiment of the invention.

FIG. 7 is a functional block diagram of a multiple-in multiple-output (MIMO) transceiver operating as a receiver according to one embodiment of the invention. A transceiver 300 includes a switch fabric 302 that is operable to couple RF received from at least one antenna to at least one antenna signal path or antenna signal path to RF front end circuitry for down conversion to one of an intermediate or baseband frequency to signal processing by a baseband processor. Specifically, switch fabric 302 includes a filter 304 that is coupled to receive filtered digital data 166 from antenna signal path 194. Filter 304 is also coupled to receive RF from antenna signal path 308 produced thereon by switch 312. Switch 312 couples at least one of antennas 206, 210, 214 and 218 to signal path 308 based upon control signals received from switch logic 316. Generally, switch 312 represents any type of switching fabric that is operable to connect any number of inputs to any number of outputs for both receive and transmit operations. Thus, for example, switch 312 may represent a group cascaded switches that selectively couple inputs to outputs for ingoing or outgoing signals. Typically, switch 312 couples 2 streams (ingoing or outgoing) to at least three antennas for ingoing or outgoing communications. While FIG. 7 illustrates receive operations, it should be understood that the illustrated circuitry also is used for transmit operations.

A filter 320 is coupled to receive RF from antenna signal path 324 from switch 312 and to produce the RF to RF front end 190. Filter 320 also is operable to extract the filtered digital clock 178 from antenna signal path 198 to produce the filtered digital clock 178 to switch logic 316. Switch logic 316 generates switching control signals over a plurality of control lines 328 based upon the filtered digital data 166 and upon the filtered digital clock 178. As may be further observed, capacitors 332 and 336 are operably disposed between the nodes that couple filter 162 to antenna signal path 194 and filter 174 to antenna signal path 198, respectively, to prevent the filtered digital data 166 and filtered digital clock 178 from being produced to RF front ends 186 and 190, respectively.

In operation, the embodiment of FIG. 7 illustrates receiver operations of transceiver 300. Primary illustrated differences include a single switching block having two ports on one side and four ports on the other side to selectively couple any antenna to either of the two antenna signal paths. It should be understood that any known switching circuitry may be implemented to achieve the functionality demonstrated in FIG. 7. Generally, though, switch 312 is operable to produce received RF onto antenna signal paths 194 and 198 for delivery to RF front ends 186 and 190. As before, antenna signal paths 194 and 198 also conduct the filtered digital data and filtered digital clock to filters within the switch fabric for delivery to internal switching logic which is operable to generate switching control signals responsive thereto. As may further be seen, capacitors 332 and 336 are inserted within the signal path of antenna signal paths 194 and 198, respectively, to prevent the filtered digital data 166 and filtered digital clock 178 from being produced to the RF front ends 186 and 190, respectively.

Figure 8:
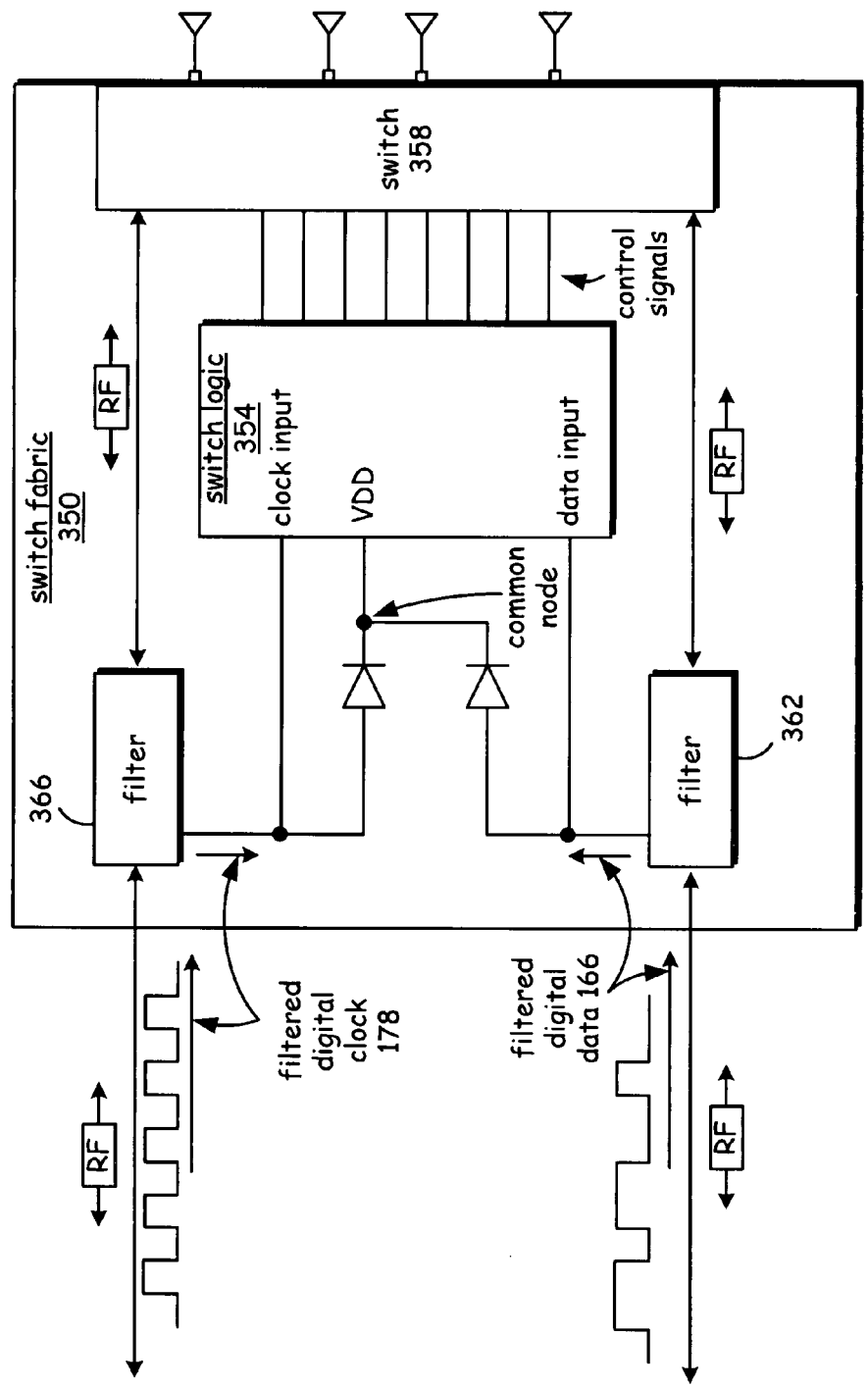
FIG. 8 is a functional schematic diagram of logic for generating control signals to at least one switch of a switching fabric according to one embodiment of the invention.

FIG. 8 is a functional schematic diagram of logic for generating control signals to at least one switch of a switching fabric according to one embodiment of the invention for either transmitter or receiver operations of a transceiver. A switch fabric 350 includes switch logic 354 and a switch 358 that operate to selectively couple specified antennas to specified antenna signal paths. Switch 358, similar to the switches shown for the other embodiments, require very low power to perform switching and thus do not require additional power to perform switching. Any necessary power is extracted from at least one received signal.

As may be seen, a pair of antenna signal paths are operable to provide filtered digital data 166 and filtered digital clock 178 to a pair of filters 362 and 366. Filters 362 and 366 are similar to filters described before in relation to each embodiment of the switch fabrics and, as described above, are operable to separate the RF (whether ingoing or outgoing) from either the filtered digital data 166 or filtered digital clock 178 according to what is being conducted on corresponding signal paths. Switch logic 354 is operably disposed to receive filtered digital data 166 and filtered digital clock 178 at a data input and at a clock input, respectively from corresponding filters 362 and 366 as may be seen and as described before. Additionally, a common node is defined to which both the filtered digital data 166 and filtered digital clock 178 are produced. The common node then produces the combination of filtered digital data 166 and filtered digital clock 178 to a power input (VDD) of switch logic 354. As such, switch logic 354 is operably powered solely by filtered digital data 166 and filtered digital clock 178. As may further be seen, a diode is coupled between each of the filters 362 and 366 and the common node to prevent the filtered digital clock 178 from being received by the data input and the filtered digital data 166 from being received by the clock input.

In operation, switch logic 354 is operably disposed to receive the filtered digital clock 178 at a clock input, the filtered digital data 166 at a data input, and a combination of the filtered digital clock 178 and the filtered digital data 166 at a power input. Switch logic 354 is operable to produce a parallel output on a plurality of control lines corresponding to a serial bit stream received as the filtered digital data 166. The parallel output then prompts switch 358 to perform corresponding switching to couple specified antennas to specified antenna signal paths as described before. As may be seen here, two antenna signal paths are shown being connected to switch 358 to carry outgoing RF for transmitter operations and ingoing RF for receiver operations.

FIG. 9 illustrates a method for transmitting and receiving RF signals and for controlling antenna switching according to one embodiment of the invention. The method initially includes transmitting outgoing or receiving ingoing communication signals through a communication port (step 400). For example, in reference to FIGS. 4, 5 and 6, the communication port is a port of the baseband processor 154 coupled to the RFIC 182. It should be understood that a separate port may be utilized by the baseband processor for transmitting in comparison to a port for receiving. Regardless of whether the transceiver is operating as a transmitter or a receiver, the method includes transmitting a specified digital data signal from a first digital data port and transmitting a digital clock from a second digital data port (step 404).

Additionally, the method includes, based upon whether the transceiver is transmitting or receiving, one of producing first and second outgoing streams from a radio front end to a switch fabric (e.g., switch fabric 202 or 252) based upon the outgoing communication signals and producing the ingoing communication signals to RFIC 182 based upon first and second ingoing streams received from a switch fabric (e.g., switch fabric 302) wherein the streams are changed from analog to digital form and from digital to analog by conversion circuitry (not shown) that is coupled between the RFIC 182 and the RF front ends (step 408).

The method further includes producing first and second outgoing RF signals based on the first and second outgoing streams from first and second radio front ends and producing first and second ingoing streams based on first and second ingoing RF signals (step 412). If operating as a transmitter, the method includes radiating outgoing RF signals based upon at least one outgoing stream and, if operating as a receiver, receiving at least one ingoing RF communication signal wherein the radiating and receiving occur over at least one of four antennas (step 416).

Thus, the method also includes conducting first and second outgoing RF signals over first and second physical antenna signal paths and the first and second ingoing RF signals between the first and second radio front ends and the selected antennas of the at least four antennas (step 420). Thus, the method includes selectively coupling any of the four antennas to signals carried on the first and second physical antenna signal paths (step 424).

One aspect of the embodiments of the invention, such as those shown in FIGS. 4-6, includes extracting operational power from at least one of the first and second physical antenna signal paths conducting RF signals (step 428). Finally, the method includes extracting control signaling from the first physical antenna signal path and extracting a clock pulse from the second physical antenna signal path (step 432).

Each of the embodiments of FIGS. 4, 5 and 6 include differences that may be further combined with other teachings of the embodiments of the present invention. For example, any embodiment may employ one or more switches to couple any plurality of antennas (e.g., 3, 4, 6 or 8) to any plurality of antenna signal paths for transmit operations as shown in relation to FIGS. 4 and 5 or receive operations shown in FIG. 7. Switches may be dedicated to a specified antenna signal path as shown in FIG. 5 or may be selectively coupled to any antenna path as shown in FIG. 6. Further, while the described embodiments illustrate serial-to-parallel switching logic, any logic that operably generates specific switching control commands to one or more switches based upon digital data produced by the baseband processor may be employed. One aspect of the present embodiments, however, is that (an antenna signal path carries both digital data and RF between the switch fabric and the RF front end or a digital clock and RF between the switch fabric and the RF front end. More generally, this aspect contemplates carrying a plurality of signals on an antenna signal path to switching circuitry proximately disposed to a plurality of antennas for selectively coupling antennas to antenna signal paths. A further aspect is that the switching circuitry is powered by the digital data or the digital clock and thus no additional power lines are necessary.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A multiple-in multiple-output (MIMO) transceiver, comprising:
    a baseband processor having a communication port for communication signals, a first digital port and a second digital port, the baseband processor operable to transmit outgoing or receive ingoing communication signals through the communication port and further operable to transmit a digital data signal from the first digital port and to transmit a digital clock signal from the second digital port;
    a radio front end integrated circuit signal processor operable to produce first and second outgoing streams based upon the outgoing communication signals from the baseband processor and further operable to receive first and second ingoing streams to produce the ingoing communication signals to the baseband processor, the first and second outgoing streams for MIMO transmission and-the first and second ingoing streams for MIMO reception;
    first and second radio front ends operable to respectively produce first and second outgoing radio frequency (RF) signals based correspondingly on the first and second outgoing streams and further operable to produce first and second ingoing streams based correspondingly on first and second ingoing RF signals;
    a plurality of antennas radiating outgoing RF signals and for receiving ingoing RF signals;
    a first signal path to conduct the first outgoing RF signal and also coupled to conduct the digital data signal;
    a second signal path to conduct the second outgoing RF signal and also coupled to conduct the digital clock signal; and
    a switch fabric operably coupled to the plurality of antennas, the first signal path and the second signal path, the switch fabric operable to decouple the digital clock signal and the digital data signal for use in controlling logic circuitry within the switch fabric to switch the first signal path to a first selected antenna selected from the plurality of antennas and to switch the second signal path to a second selected antenna selected from the plurality of antennas for MIMO transmission and reception, wherein the switch fabric obtains operational power to power the logic circuitry within the switch fabric from the digital clock signal and the digital data signal.

2. The transceiver of claim 1 further including a first filtration circuitry coupled between the first digital port and the first signal path to selectively pass the digital data signal to the first signal path and to block RF components.

3. The transceiver of claim 2 further including a second filtration circuitry coupled to the first signal path, wherein the second filtration circuitry is operable to pass the digital data signal to a data input of the logic circuitry of the switch fabric and wherein the second filtration circuitry is operable to pass RF signals between the first signal path and the first selected antenna.

4. The transceiver of claim 3 further including a third filtration circuitry coupled between the second digital port and the second signal path to selectively pass the digital clock signal to the signal path and to block RF components.

5. The transceiver of claim 4 further including a fourth filtration circuitry, coupled to the second signal path, wherein the fourth filtration circuitry is operable to pass the digital clock signal to a clock input of the logic circuitry of the switch fabric and wherein the fourth filtration circuitry is operable to block pass RF signals between the second antenna signal path and the second selected antenna.

6. The transceiver of claim 1 wherein the logic circuitry of the switch fabric includes a shift register operable to receive the digital data signal as a serial data stream and to produce a parallel output to prompt the switch fabric to perform antenna switching based upon the parallel output of the shift register.

7. A multiple-in multiple-output (MIMO) transceiver, comprising: a baseband processor having a communication port for communication signals, a first digital port and a second digital data port, the baseband processor operable to transmit outgoing communication signals through the communication port and further operable to transmit a digital data signal from the first digital port and to transmit a digital clock signal from the second digital port;
   a radio front end signal processor operable to produce a plurality of transmission streams based upon the outgoing communication signals from the baseband processor, the plurality of transmission streams for MIMO transmission;
   a plurality of radio front ends each operable to receive a corresponding one of the transmission streams and produce a corresponding outgoing RF signal on a respective signal path of a plurality of signal paths;
   a plurality of antennas for transmitting outgoing RF signals from the plurality of RF front ends;
   wherein the digital data signal from the baseband processor is also coupled to a first signal path of the plurality of signal paths and the digital clock signal is also coupled to a second signal path of the plurality of signal paths; and
   a switch fabric operably coupled to the plurality of antennas and the plurality of signal paths, the switch fabric operable to decouple the digital clock signal and the digital data signal for use in controlling logic circuitry within the switch fabric to switch each signal path to a selected antenna selected from the plurality of antennas for MIMO transmission of the outgoing RF signals, wherein the switch fabric obtains operational power to power the logic circuitry within the switch fabric from the digital clock signal and the digital data signal .

8. The transceiver of claim 7 wherein the plurality of signal paths is equal to at least two and wherein the plurality of antennas is equal to at least three.

9. The transceiver of claim 7 further including a first filtration circuitry coupled between the first digital port and the first signal path to selectively pass the digital data signal to the signal path and to block RF components.

10. The transceiver of claim 9 further including a second filtration circuitry, coupled to the first signal path, made wherein the second filtration circuitry is operable to pass the digital data signal to a data input of logic circuitry of the switch fabric and wherein the second filtration circuitry is operable to pass RF signals between the first signal path and a correspondingly selected antenna.

11. The transceiver of claim 10 further including a third filtration circuitry coupled between the second digital port and the second signal path to selectively pass the digital clock to the second signal path and frequency to block RF components.

12. The transceiver of claim 11 further including a fourth filtration circuitry, coupled to the signal path, and wherein the fourth filtration circuitry is operable to pass the digital clock signal to a clock input of the logic circuitry of the switch fabric and power to wherein the fourth filtration circuitry is operable to block pass RF signals-on between the second antenna signal path and a correspondingly selected antenna.

13. The transceiver of claim 12 wherein the logic circuitry of the switch fabric includes a shift register operable to receive the digital data signal as a serial data stream and to produce a parallel output to prompt the switch fabric to perform antenna switching based upon the parallel output of the shift register.

14. A method of transmitting RF signals from a plurality of antennas that are utilized for multiple-in multiple-output (MIMO) transmissions, comprising:
   transmitting outgoing communication signals through a communication port of a baseband processor of a MIMO transceiver,
   transmitting a digital data signal from a first digital port of the baseband processor and transmitting a digital clock signal from a second digital port of the baseband processor;
   producing first and second outgoing streams from a radio front end based upon the outgoing communication signals from the baseband processor;
   producing first and second outgoing RF signals based respectively on the first and second outgoing streams from the radio front end;
   transmitting first and second outgoing RF signals respectively over first and signal paths coupling the digital data signal to the first signal path to conduct with the first outgoing RF signal:
   coupling the digital clock signal to the second signal path to conduct with the second outgoing RF signal;
   extracting operational power from both the digital data signal and the digital clock signal to operate a logic circuitry in a switch fabric; and
   switching selectively, under control of the logic circuitry of the switch fabric, the first signal path to a first antenna from a plurality of antennas and to switch the second signal path to a second antenna from the plurality of antennas to transmit RF signals from more than one antenna for MIMO transmission.

15. The method of claim 14 further filtering to pass the digital data signal to the signal path and frequency to block RF components.

16. The method of claim 15 further including filtering to pass the digital clock to the second signal path and frequency to block RF components.

17. The method of claim 16 further including receiving the digital data signal as a serial data stream into a shift register and producing a parallel output from a shift register to perform selective switching based upon the parallel output.

* * * * *

UNITED STATES PATENT AND TRADEMARK OFFICE
CERTIFICATE OF CORRECTION

PATENT NO. : 8,068,805 B2
APPLICATION NO. : 11/716854
DATED : November 29, 2011
INVENTOR(S) : Prakash Guda et al.

Page 1 of 1

It is certified that error appears in the above-identified patent and that said Letters Patent is hereby corrected as shown below:

Col. 18, line 33, in claim 14: after "over" replace "first and signal paths" with --first and second signal paths--
Col. 18, line 50, in claim 16: after "digital clock" insert --signal--

Signed and Sealed this
Twelfth Day of February, 2013

Teresa Stanek Rea
*Acting Director of the United States Patent and Trademark Office*